United States Patent
Sieben

(10) Patent No.: US 10,752,364 B2
(45) Date of Patent: Aug. 25, 2020

(54) VARIABLE SEAT MODULE WITH AN OTTOMAN FOR A SEATING ARRANGEMENT IN A VEHICLE CABIN

(71) Applicant: Airbus Operations GmbH, Hamburg (DE)

(72) Inventor: Martin Sieben, Hamburg (DE)

(73) Assignee: Airbus Operations GmbH (DE)

( * ) Notice: Subject to any disclaimer, the term of this patent is extended or adjusted under 35 U.S.C. 154(b) by 361 days.

(21) Appl. No.: 15/652,090

(22) Filed: Jul. 17, 2017

(65) Prior Publication Data
US 2018/0029716 A1 Feb. 1, 2018

(30) Foreign Application Priority Data
Jul. 29, 2016 (EP) ...................................... 16182035

(51) Int. Cl.
*B64D 11/06* (2006.01)

(52) U.S. Cl.
CPC ...... *B64D 11/0643* (2014.12); *B64D 11/0604* (2014.12); *B64D 11/0696* (2013.01)

(58) Field of Classification Search
CPC ............ B64D 11/0601; B64D 11/0602; B64D 11/0604; B64D 11/0639; B64D 11/06395; B64D 11/0641; B64D 11/0643
USPC ..................................................... 244/118.6
See application file for complete search history.

(56) References Cited

U.S. PATENT DOCUMENTS

| | | | |
|---|---|---|---|
| 5,100,092 A * | 3/1992 | Sovis | B60N 2/071 248/429 |
| 5,716,026 A | 2/1998 | Pascasio et al. | |
| 6,352,309 B1 * | 3/2002 | Beroth | B64D 11/06 297/354.13 |
| 8,245,994 B2 * | 8/2012 | Yamada | B60N 2/073 248/424 |
| 9,315,270 B2 * | 4/2016 | Dryburgh | B64D 11/06 |
| 9,533,765 B2 * | 1/2017 | Vergnaud | B64D 11/06 |
| 9,604,724 B2 * | 3/2017 | Savard | B64D 11/06 |
| 9,650,145 B2 * | 5/2017 | Lambert | B60N 2/0284 |
| 10,000,288 B2 * | 6/2018 | Udriste | B64D 11/064 |
| 2015/0136904 A1 | 5/2015 | Savard et al. | |
| 2017/0088267 A1 * | 3/2017 | Dowty | B64D 11/00153 |

FOREIGN PATENT DOCUMENTS

| | | |
|---|---|---|
| EP | 1364874 B1 | 3/2006 |
| EP | 2303692 B1 | 11/2013 |
| EP | 2783985 A1 | 1/2014 |

OTHER PUBLICATIONS

Extended European Search Report for Application No. 16182035.2, dated May 29, 2017.

* cited by examiner

*Primary Examiner* — Christopher P Ellis
(74) *Attorney, Agent, or Firm* — Lerner, David, Littenberg, Krumholz & Mentlik, LLP

(57) ABSTRACT

A seat module includes a passenger seat attachable to a cabin floor, and a separate ottoman unit associated with the passenger seat. The ottoman unit has at least one resting surface for a passenger and a base, which base is attachable to the cabin floor by an adjustment unit at a position in a first direction of the passenger seat. The adjustment unit is configured to allow a selective displacement of the ottoman unit relative to the cabin floor along the first direction and at least a second direction perpendicular thereto into a seating position and a resting position of the seat module.

13 Claims, 5 Drawing Sheets

VARIABLE SEAT MODULE WITH AN OTTOMAN FOR A SEATING ARRANGEMENT IN A VEHICLE CABIN

CROSS-REFERENCE TO PRIORITY APPLICATION

This application claims the benefit of, and priority to, European patent application number 16182035.2, filed Jul. 29, 2016.

TECHNICAL FIELD

Embodiments of the subject matter described herein relate to a seat module for a vehicle cabin having a passenger seat and an ottoman unit associated with the passenger seat. The embodiments further relate to a seating arrangement for a cabin of a vehicle, as well as a vehicle having a cabin and a seating arrangement position therein.

BACKGROUND

In commercial passenger transportation systems, often a plurality of different seating classes is provided. Particularly in cabins of aircraft for long-haul flights, exceptional individual space is provided in business and first class arrangements. For example, it is known to integrate seat modules having a passenger seat and an ottoman unit associated thereto. Such a seat module is commonly adapted for providing a seating position as well as a bed function, in which the components of the passenger seat as well as a resting surface of the ottoman unit are converted to provide an enlarged, closed bed-like surface. Further, these seat modules often are surrounded by or shielded with partition wall elements, which provide an exceptional privacy for the individual passenger on the respective seat module.

For the integration of these seat modules, different layouts are known. For example, a plurality of seat modules may be arranged in a staggered layout, wherein the individual ottoman units are aligned so as to face into an aisle of the passenger cabin. Other layouts are known, in which the seat modules are arranged in a parallel orientation to adjacent aisles.

Due to the exceptional personal space for an individual passenger, the integration of these seat modules into a passenger cabin requires a relatively large installation space. However, seat modules having these functions are commonly only used for a rather small fraction of the available cabin area.

European patent document EP 1 364 874 B1 discloses individual seat modules comprising a seat, armrests and equipment located opposite and at a distance from the seat, wherein a lateral wall extends between one side of the seat and a side of the equipment, thereby defining a long space having an end of large width occupied by the seat and a narrower end occupied by the equipment, wherein an access opening is located between the ends opposite the lateral wall.

European patent document EP 2 303 692 B1 shows a seat module for an aircraft passenger, comprising a seat with a horizontal squab and a backrest, and a separation panel extending along at least one side of the seat, wherein the seat is able to move between a straight position, in which the backrest of the seat extends approximately vertically, and a reclined position, in which the backrest extends in a plane approximately perpendicular to the separation panel.

European patent document EP 2 783 985 A1 discloses an assembly having a set of seats, where each seat is convertible individually by a relative movement of a seat cushion and a seat back between sitting and recumbent configurations.

BRIEF SUMMARY

Due to the limitations in space and weight it may be beneficial to improve the layout of a cabin section having a plurality of these seat modules in order to increase the number of seat modules per cabin area, such that either more seat modules may be integrated into the same cabin section or such that less space is required for providing a certain number of seat modules. Consequently, it is an object to propose a seat module or a layout of a cabin section that allow to improve the integration into a cabin of an aircraft with regard to space efficiency, while at the same time the personal comfort as well as a structural integrity of the seat module is at least maintained.

This object is met by a seat module for a vehicle cabin having the features of independent claim 1. Advantageous embodiments and further improvements may be gathered from the subclaims and the following description.

A seat module is proposed, comprising a passenger seat attachable to a cabin floor, a separate ottoman unit associated with the passenger seat, the ottoman unit having at least one resting surface for a passenger and a base, which base is attachable to a floor by means of an adjustment unit at a position in a first direction of the passenger seat, wherein the adjustment unit is configured to allow a selective displacement of the ottoman unit relative to the floor along the first direction and at least a second direction perpendicular thereto.

The seat module according to an embodiment of the invention provides a variable business class ottoman seat, which is designed to be independent from a primary structure of the passenger seat as well as the structure of adjacent seats. This is essentially contrary to today's known business class seats, where the ottoman may be designed to be an integral part of the seat in front of it. In addition, the ottoman unit is attachable to the floor or floor structures by means of an adjustment unit, that allows the repositioning of at least the resting surface in at least two directions. Consequently, the ottoman unit is easily repositionable during flight, independent from the passenger seat.

The passenger seat is to be understood as a component, which has a seating element and a back rest. The seating element may be movably supported on a seat frame along a first direction or a seating direction, which may be equal or similar to the viewing direction of a passenger, who sits on the passenger seat straightly. Additionally, the backrest may be at least swivably supported on the seat frame to adjust a backrest angle. The back rest and the seating element may be supported on the seat frame in a way to allow a common motion from a seating position, in which the seating element and the back rest enclose a distinct angle below 180°, into a resting position, in which the seating element and the back rest enclose an angle of essentially 180°.

The ottoman unit in turn at least provides the capability of letting a passenger put up feet and legs. In combination with the above described passenger seat a full bed surface can be provided selectively, i.e., on demand. The adjustment unit is capable of moving the ottoman unit relative to the floor along at least two directions, i.e., the first or seating direction relative to the passenger seat and an additional direction perpendicular thereto. The definition of the first direction does not necessarily depend from the passenger seat associated with the ottoman unit, since both units are independent from each other. The ottoman unit and the adjustment unit, respectively, should allow to provide a movability along a direction, which may be parallel to the first or seating direction when the adjustment unit and the ottoman unit are coupled with the same floor as the passenger seat.

The other second direction, along which the ottoman unit is movable, may be in a plane parallel to the floor, to which the adjustment unit is attachable. However, also an alternate second direction, which is basically perpendicular to the floor plane, may be possible. Even further, both different second directions may be provided in combination.

Considering the object to improve the space efficiency in the cabin it may be worthwhile to stagger seat modules not only in a longitudinal direction of the cabin, but also in a lateral direction. Some seat modules may then be arranged directly adjacent to an aisle, while some seat modules may be placed between two other seat modules in a lateral direction. Access to these may then be provided through access paths between ottoman units that are directly adjacent to the aisle and passenger seats that are arranged further forward.

The seat module allows to adapt the position of the ottoman unit to selectively influence the dimension (width) of a cross aisle or access path to a seat module that is not directly adjacent to a longitudinal aisle in the cabin. The access path may preferably be widened during basically the whole boarding process, since a passenger may need to use this access path several times during boarding to stow a jacket and other personal items, such as carry-on luggage. In addition, a passenger sitting in a seat module directly adjacent to the aisle would not immediately require a seat position with a maximum forward position of the ottoman unit. However, during the flight the access path influenced by the ottoman unit may be narrowed, since it is rather unlikely used for a certain period of time.

In a seating position of the first seat module the ottoman unit is moved so as to provide a maximum access path to the second seat module. In this regard it is indicated that the access path preferably never exceeds a width of 20 inch (50.8 cm) in order to maintain a certain degree of space efficiency. In a resting position of the first seat module, an access path should be maintained, which may be very narrow, but which would allow a passenger to pass through it when desired. It is conceivable that such a narrow access path has a width of at least 8 inches (20.3 cm). The design of the access path may be chosen to not unduly limit the personal comfort of passengers. It may be considered larger passengers or pregnant women.

Further, due to the improved movability of the ottoman unit, it may selectively be moved further into an adjacent aisle. This allows to provide an increased personal space in flight phases where catering is not conducted. Consequently, a reduced width of a longitudinal aisle is acceptable by the flight crew and other passengers. Additionally, niches or recesses are providable when moving the ottoman unit further into the aisle, since a passenger seat of a seat module further forward is commonly fixed in its position, leading to the creation of a small, shielded niche, which adjoins a narrowed access path between two seat modules. Here, a passenger can temporarily stand in case a serving trolley, other passengers or flight crew members have to pass.

In an advantageous embodiment, the minimum width of the aisle adjacent to the first seat module is at least 15 inch (38 cm) and preferably 16 inch (40.6 cm), which allows moving a full size trolley according to the Atlas standard, which comprises a width of 31 cm, along the aisle.

In an advantageous embodiment, the adjustment unit is an automatic adjustment unit comprising at least one actuator for moving the adjustment means. The actuator may be realized through various different types of actuators, such as electrohydraulic or pneumatic actuators, spindle gears driven by electric motors and the like. Through such a setup, the adjustment means allows to conduct a selective motion independent from any movement of the passenger seat. It may be particularly useful to use a plurality of actuators for individually moving the adjustment means in individual directions. This greatly improves the degree of freedom of the ottoman unit. The at least one actuator is preferably coupled with a control unit, which controls the operation of the at least one actuator. The control unit may be a separate unit for one or a plurality of seat modules. Further, the control unit may be integrated into a control unit or control computer already present in the cabin. The operation of the at least one actuator may be initiated by a signal, which may be initiated by a passenger on the seat module. As an alternative or addition, this signal may be initiated by cabin personal, for example through a flight attendant panel (FAP). The control unit may be adapted to provide at least two pre-programmed positions, into which the adjustment unit may be moved. The first position may be associated with a boarding mode, in which a smaller distance to the passenger seat is provided. At least a second position may be associated with a resting or bed mode, in which the at least one resting surface and the passenger seat may in combination provide a bed-like surface. It may be possible to define at least a third position, which may be an intermediate position between the first and second position.

In an alternative embodiment, the adjustment unit is a passive unit, which comprises at least one holding means, which is adapted to urge the at least one resting surface in a neutral position and wherein the adjustment unit is adapted for allowing a motion of the resting surface into at least one second position. Hence, the at least one resting surface may be urged into the at least one second position against a holding force induced by the holding means. For example, a passenger on the respective seat module may press or push on the at least one resting surface in order to move it into the desired second position. As an alternative, the passenger seat may push the at least one resting surface into the second position, when it is converted to a bed position. This may be conducted by a seat element being moved along the first direction, thereby touching the ottoman unit and pushing it against the holding force.

Particularly in the latter case, the adjustment unit also comprises an arresting unit for releasably arresting the ottoman unit in the at least one second position. Hence, particularly when the user pushes the ottoman unit into a second position, it will remain there until the arresting means is released. Additionally, when the passenger seat is designated to push the ottoman unit from a neutral position to a second position, arresting the ottoman unit may prevent continuous mechanical stresses on the passenger seat.

In another advantageous embodiment, the adjustment unit is a manual adjustment unit comprising at least one operating element for releasably locking the ottoman unit in a momentary position, wherein the adjustment unit is adapted for allowing a displacement through a user manually acting on the ottoman unit after unlocking it through the at least one operating element. The ottoman unit may be realized in a cost efficient manner and still enables a user-friendly and free operation of the ottoman unit.

In a preferred embodiment, the at least one resting surface comprises the same height as a seat surface of the passenger seat. This allows converting the passenger seat and the ottoman unit to a bed and, particularly, allows the seat surface to push the at least one resting surface from the neutral position to the second position.

The ottoman unit may be movable in a direction vertical to a cabin floor or the base, respectively. The height of an ottoman unit directly adjacent to an aisle, at least in the resting position, should not exceed 25 inches (63.5 cm). If this measure can be guaranteed, a minimum aisle width of 15 inches may be realised to conform common certification rules.

Still further, the ottoman unit may be compactable in the direction vertical to the cabin floor or the base, respectively. A height of the ottoman unit as low as, e.g., 20 cm may be achieved in a compacted state, without requiring a cutout or recess in the floor, into our out of the ottoman unit may be moved. Providing a certain minimum height may prevent tripping hazards. Further, the lower the ottoman unit is intended to be moved, the more complex the associated design of the adjustment unit may be. For example, if a lowering of the ottoman unit to be even with the cabin floor would be desired, it would have to be lowered into the floor and underneath.

Embodiments of the invention further relate to a seating arrangement for a cabin of a vehicle, the seating arrangement having a cabin floor and a plurality of seat modules according to the above description and at least one longitudinal aisle, along which the plurality of seat modules is arranged, wherein the first direction is essentially parallel to a main extension direction of the aisle. Hence, the ottoman unit allows a motion at least along the extension direction of the longitudinal aisle and in a direction perpendicular to the aisle. This may be essentially parallel to the cabin floor, i.e., into and out of the aisle, or it may be in a position vertical thereto, i.e., by lifting or lowering the ottoman unit. In the first case, the ottoman unit may selectively extend into the longitudinal aisle, such that its width is reduced.

In an advantageous embodiment a plurality of first seat modules is arranged directly adjacent to the longitudinal aisle one behind the other, wherein a second group of a plurality of seat modules is arranged directly adjacent to the first seat modules opposite to the longitudinal aisle and wherein an access path to seat modules of the second group is provided between ottoman units and passenger seats of two seat modules arranged behind each other. Primarily during a boarding period a distance between an ottoman unit and a passenger seat of a seat module in front of the ottoman unit, i.e. along the first direction, provides a sufficient access path from the longitudinal aisle to the second group of seat modules.

Preferably, the first seat modules and the second seat modules comprise a staggered arrangement, such that second seat modules comprise a different longitudinal position then the first seat modules. By providing the access path between an ottoman unit and a passenger seat arranged in front, an access to a second seat module is improved when a free space between the second ottoman unit and the second passenger seat intersects with the exit path. The longitudinal distance between the adjacent seat modules may be equal to the minimum width of an access path described above, i.e., preferably at least 8 inches (20.3 cm).

It is preferred that the ottoman units of the second seat modules, which are to be reached through the access path, are fixedly mounted on the cabin floor. Hence, the second seat modules may be realized with a reduced complexity compared to the first seat modules.

It is preferred that the ottoman units of at least the first seat modules comprise a depth along the longitudinal direction that decreases with increasing distance to the adjacent aisle. Hence, a further improvement of space efficiency is accomplished, since a largest possible resting surface is possible by diagonally resting on the seat module, in which a maximum depth of the ottoman unit as well as the diagonal orientation of the passenger are combined. It is not required to provide a large resting surface with a continuous maximum length, since this would only be used by a fraction of passengers.

Advantageously, the seating arrangement may comprise two longitudinal aisles, between which a plurality of central rows of two first seat modules enclosing two second seat modules is arranged.

Further advantageously, the seating arrangement may further comprise a plurality of lateral rows of first seat modules arranged at lateral outer positions directly adjacent to one of the aisles and second seat modules at a lateral outer position directly adjacent to the first seat modules and opposite the respective aisle.

Embodiments of the invention further relate to an aircraft having a fuselage and a cabin with at least one such seating arrangement positioned therein.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of embodiments of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
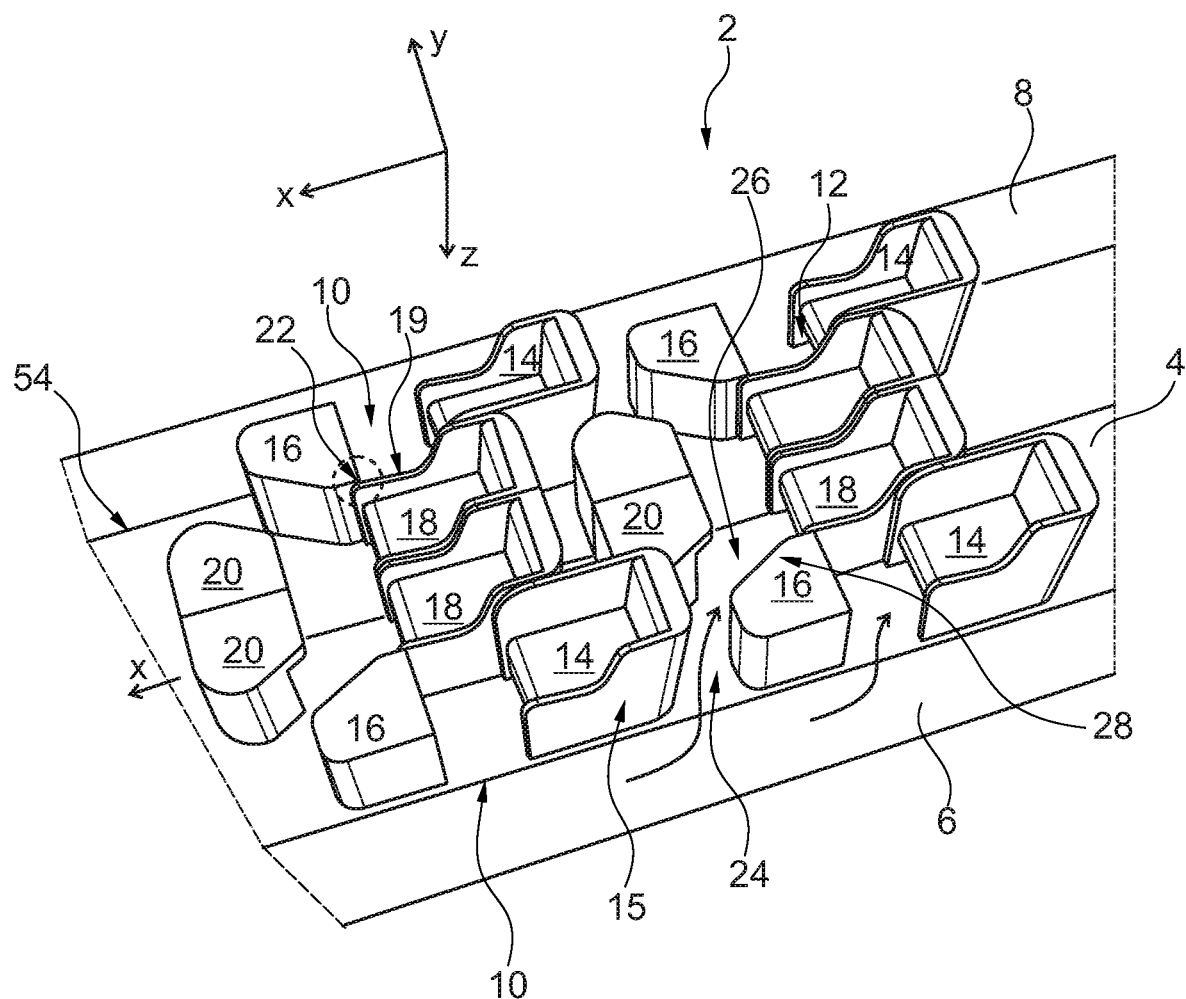
FIG. 1 shows a seating arrangement in a three-dimensional view.

FIG. 1 shows a seating arrangement 2 in a cabin 54 of an aircraft with a cabin floor 4, a first longitudinal aisle 6 and a second longitudinal aisle 8 extending parallel thereto. The cabin floor and the aisles extend in a longitudinal direction, exemplarily defined by an x-axis of an aircraft fixed coordinate system.

On the cabin floor 4, first seat modules 10 are arranged directly adjacent to one of the aisles 6 or 8. A plurality of second seat modules 12 are arranged adjacent to the first seat modules 10 and not directly adjacent to the first and second aisles 6 and 8. In other words, the second seat modules 12 are surrounded by first seat modules 10. All seat modules 10 and 12 are shown in their seating positions, in which a passenger may sit on the respective seating module.

The first seat modules 10 each comprise a first passenger seat 14 as well as a first ottoman unit 16. The design of the first seat modules 10 adjacent to the first aisle 6 is mirror inverted in comparison to the first seat modules 8 adjacent to the second aisle 8 for adapting their shape to the different lateral sides on the cabin floor 4. Similarly, the second seat modules 12 each comprise passenger seats 18 as well as preferably fixedly mounted ottoman units 20. To adapt the shape to the different sides on the cabin floor, two sets of second seat modules 12 are present, which are designed in a mirror inverted manner. The first seat modules 10 and the second seat modules 12 are arranged symmetrically about the x-axis. The whole seating arrangement 2 may be mirror inverted about a symmetry axis c extending through the center of the cabin 54.

The second seat modules 12 are positioned at a slight further forward position relative to the adjacent first seat modules 10 in the direction of the x-axis. The longitudinal distance between their mounting positions may approximately be in a range of 8 to 13 inch. This may lead to a longitudinal overlapping degree of two adjacent seats 14 and 18 of up to 50%. Resultantly, in the illustrated example, first ottoman units 16 slightly intersect with second passenger seats 18 of an adjacent second seat module 12 in the x direction, as indicated with a dashed circle 22.

The first ottoman units 16 are exemplarily in their neutral positions, in which a passenger on the first passenger seat 14 may simply sit and enjoy the provided legroom. Between a first ottoman unit 16 and a first passenger seat 14 in front of it, a maximum distance is provided, which allows the intermediate space to be used as an access path 24 from an aisle 6 or 8 to a second seat module 12. The maximum distance may comprise up to 20 inches or less in order to not waste space inside the cabin. Hence, a passenger may comfortably reach a free intermediate space 26 of second seat modules 12 from the aisle 6 and 8 without disturbing a passenger sitting in the first seat module 10 adjacent to the respective second seat module 12.

Exemplarily, but not necessarily, adjacent ottoman units 16 and 20 each comprises a vertical delimiting wall 28 and 30, which face each other and enclose an angle in a range of 20° to 70°, advantageously between 35° and 55° and preferably around 45° with the x-axis. Between the delimiting walls 28 and 30 the access paths 24 are defined. Due to the above mentioned angle, the access paths 24 are not perpendicular to the x-axis, thereby allowing to reduce a longitudinal shift between the first seat modules 10 and the second seat modules 12. This allows to fix adjacent passenger seats to the same seat structure or such, if considered beneficial. The angle between the access paths 24 and the x-axis may be in a range of 45° to 135°, such that the access paths 24 are not perpendicular to the adjacent aisle, but may enclose an angle of up to 45° to it in or against the x direction. Preferably the angle is in a range of 65° to 115° and most preferably between 75° and 105°.

Even though it is not explicitly shown in FIG. 1, between the second seat modules 12 a vertical partition may be arranged in order to provide a further improved privacy particularly for the passengers resting in the second seat modules 12.

The first passenger seat 14 and the second passenger seat 18 are equipped with sidewalls 15 and 19, respectively, which basically extend from the cabin floor 4 in an upright position and provide a certain privacy level for the passenger resting on the respective passenger seat 14 and 18, respectively. As shown in the different figures, the sidewalls of two adjacent seats 14, 18 complement each other to provide a continuous closed partition. Since the first ottoman unit 16 slightly intersects with the second passenger seat 18, the partition follows on up to the most forward point of the first ottoman unit 16.

Figure 2:
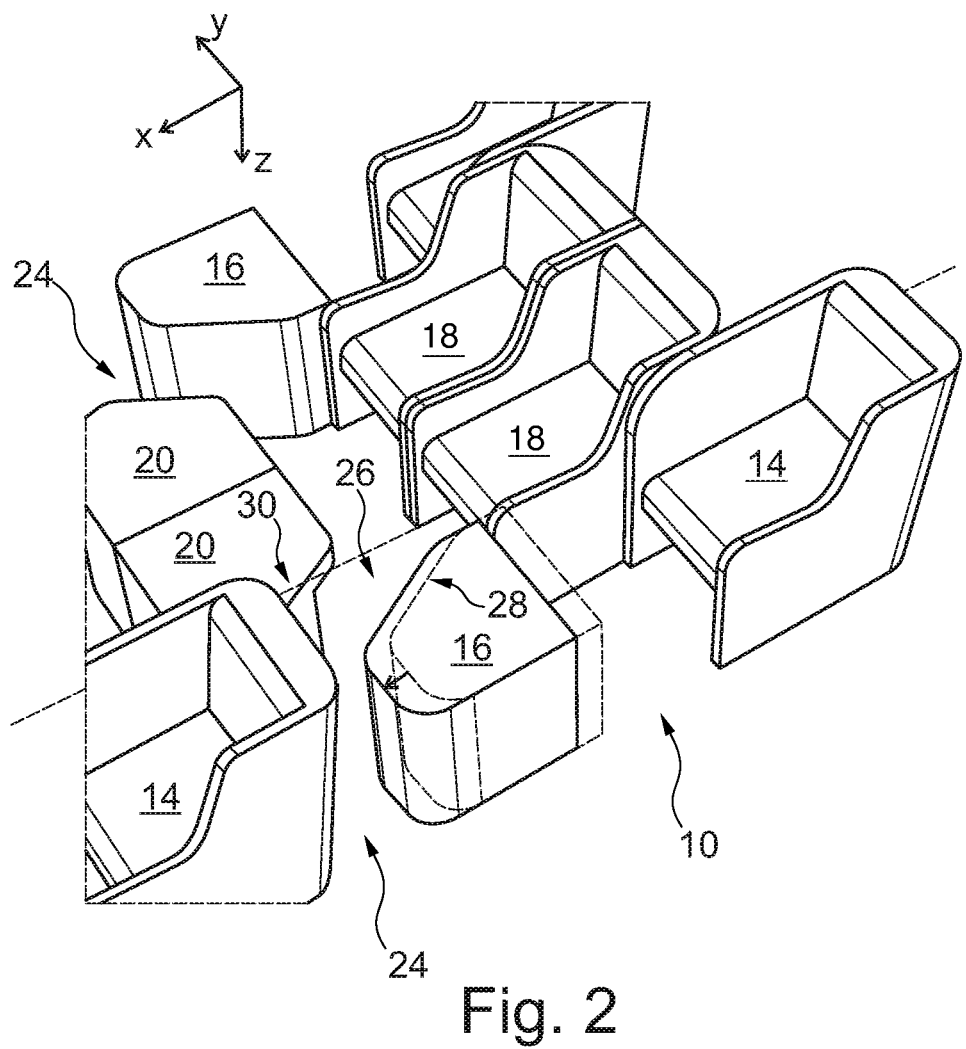
FIGS. 2 and 3 show a detail of a seat module regarding the movability of an ottoman unit.

FIG. 2 schematically shows a position of a first ottoman unit 16, which is moved further forward from the neutral position shown in FIG. 1 in the x-direction. This leads to a slight narrowing of the access paths 24. In this position, the first seat module 10 is able to provide a closed resting surface, when components of the first passenger seat 14 are folded down and at least partially moved towards the first ottoman unit 16 (not shown). For example, during cruise flight and after serving meals, passengers may want to rest on a long-haul flight, such that the access path 24 would not be used. Therefore, the narrowing of the access path 24 is acceptable.

Figure 3:
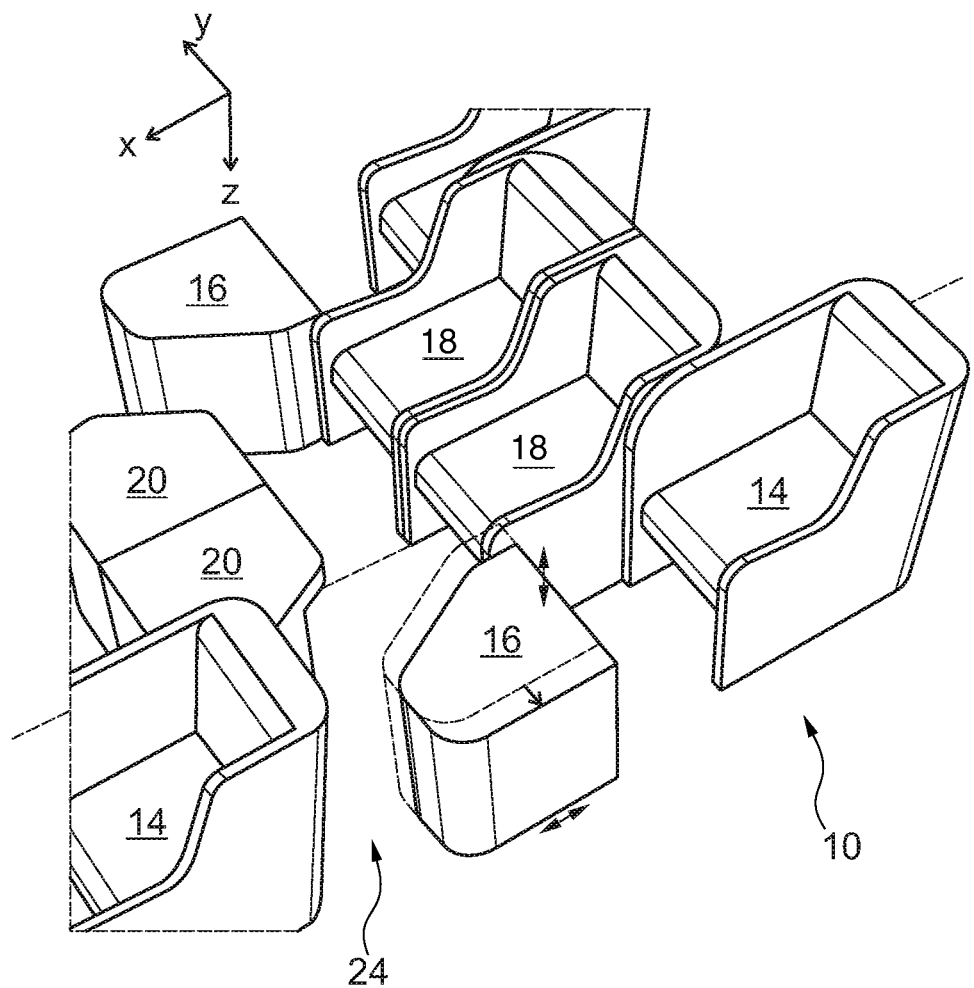

For even further increasing the available surface area in a bed mode of the first seat module 10, a motion of the first ottoman unit 16 along an y-axis, which is perpendicular to the x-axis and parallel to the cabin floor 4, may be conducted. This is shown in FIG. 3. The motion in the y direction may be conducted alternatively or additionally to the motion in the x direction. Further, a motion along a z-axis may also be possible and desired, such as to compact the ottoman unit 16 vertically. Depending on the detail design of the passenger seat 14, a passenger may rest diagonally in the seat module 10. Hence, with increasing lateral shift of the first ottoman unit 16, an increased space is provided for the passenger.

Figure 4A:
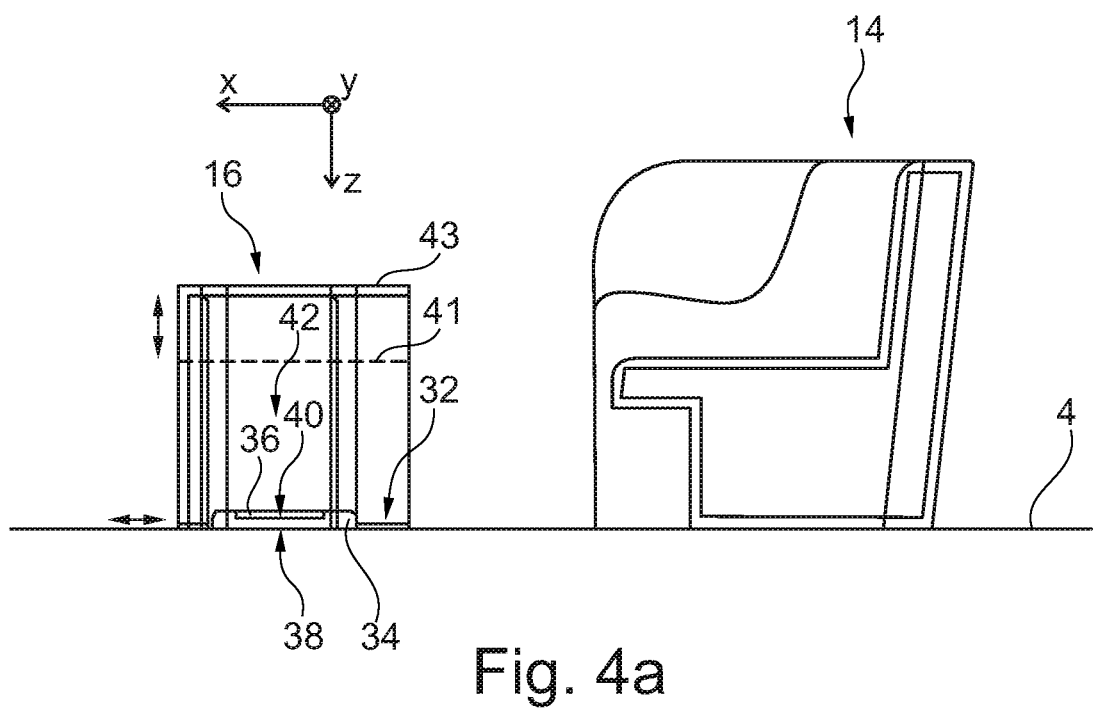
FIGS. 4a and 4b show a seat module in a lateral, partly sectional view and a three-dimensional, partly sectional view.

The ottoman units 16 and 20 rest on a base 32, which is exemplarily shown in FIG. 4a based on the first ottoman unit 16. The base 32 may simply be a planar surface, which comprises a cut-out 34, in which a rail 36 is arranged that is attachable to a seat rail 38 arranged in the cabin floor 4. The rail 36 and fastening means 40, which are merely schematically shown, are to be considered the adjustment unit 42.

In FIG. 4a further two possible resting surfaces 41 and 43 are illustrated. An exemplary resting surface 41 may be integrated into the ottoman unit 16 for access only from the direction of the seat 14. The resting surface 41 may be separately movable, if desired. Alternatively or additionally, the top of the ottoman unit 16 may be used as a resting surface 43.

Figure 4B:
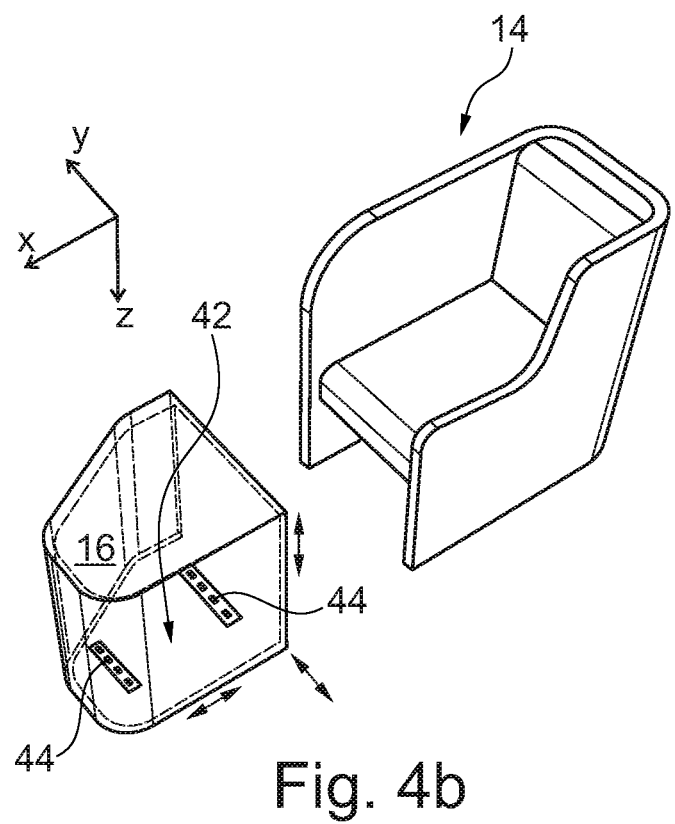

Rails 44 of the adjustment unit 42 may also, i.e. alternatively or additionally, be arranged perpendicular to the x direction as shown in FIG. 4b. Still further, the adjustment means 42 may comprise a lifting means, which allows to increase the height of the ottoman unit 16.

Figure 5:
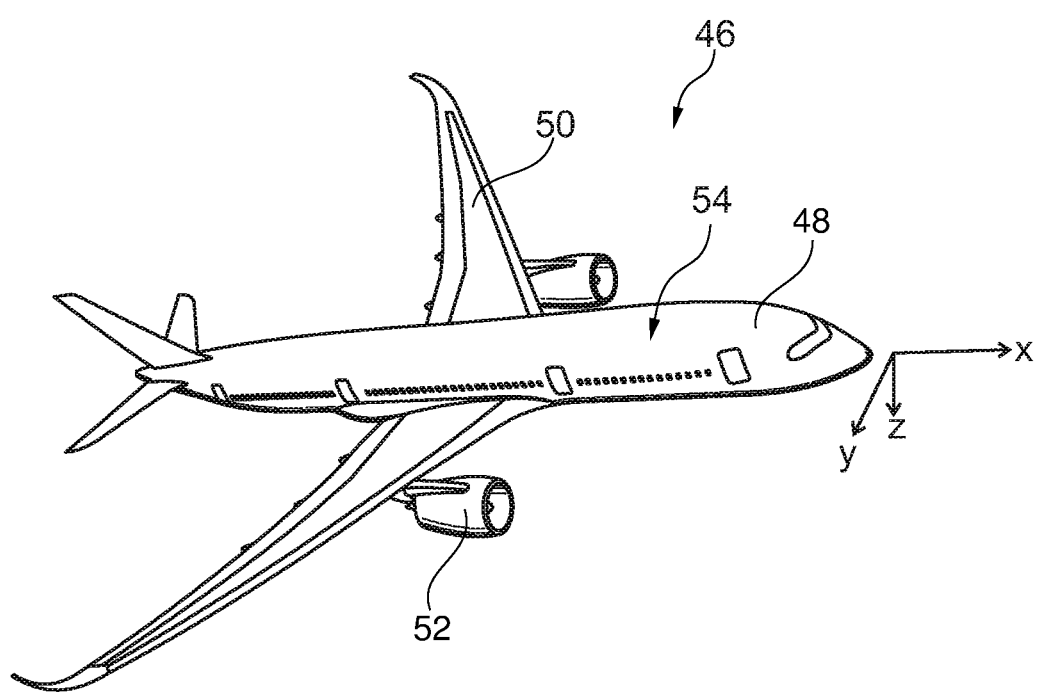
FIG. 5 shows an aircraft having a cabin with a seating arrangement according to the above.

Finally, FIG. 5 shows an aircraft 46 in a three-dimensional view, the aircraft 46 having a fuselage 48, wings 50 and engines 52. In the fuselage 48 a cabin 54 is arranged, which may comprise two parallel aisles 6 and 8, between which a seating arrangement 2 according to FIG. 1 is positioned.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A seat module for a passenger cabin having an aisle, comprising:
   a passenger seat attachable to a cabin floor; and
   a separate ottoman unit associated with the passenger seat, the ottoman unit having at least one resting surface for a passenger and a base attachable to the cabin floor by an adjustment unit at a position in a first direction of the passenger seat, wherein the first direction is parallel to a main extension direction of the aisle;
   wherein the adjustment unit is configured to allow a selective displacement of the ottoman unit relative to the cabin floor along the first direction and a second direction perpendicular to the main extension direction of the aisle and parallel to a plane of extension of the cabin floor, into a seating position and a resting position of the seat module;
   wherein a delimiting wall of the ottoman unit defines a passenger access path, the adjustment unit is configured to move the ottoman unit to widen the access path for the seating position, and the adjustment unit is configured to move the ottoman unit to narrow the access path for the resting position.

2. The seat module according to claim 1, wherein the adjustment unit is an automatic adjustment unit comprising at least one actuator for moving the ottoman unit.

3. The seat module according to claim 1,
   wherein the adjustment unit is a passive adjustment unit adapted to urge the ottoman unit in a neutral position, and
   wherein the adjustment unit is adapted for allowing a motion of the ottoman unit into at least one second position.

4. The seat module according to claim 1,
   wherein the adjustment unit is a manual adjustment unit configured to releasably lock the ottoman unit in a momentary position, and
   wherein the adjustment unit is adapted for allowing a displacement through a user manually acting on the ottoman unit after unlocking it.

5. The seat module according to claim 1, wherein the at least one resting surface comprises the same height as a seat surface of the passenger seat in a resting position.

6. The seat module according to claim 1, wherein the ottoman unit is movable in a direction vertical to the cabin floor, wherein the height of the ottoman unit in the resting position does not exceed 63.5 cm.

7. The seat module according to claim 1, wherein the ottoman unit is compactable in a direction vertical to the cabin floor, wherein the height of the ottoman unit in a compacted state is at least 20 cm.

8. A seating arrangement for a cabin of a vehicle, the seating arrangement comprising:
   a cabin floor;
   a plurality of seat modules, each of the seat modules comprising:
      a passenger seat attachable to a cabin floor; and
      a separate ottoman unit associated with the passenger seat, the ottoman unit having at least one resting surface for a passenger and a base attachable to the cabin floor by an adjustment unit at a position in a first direction of the passenger seat;
      wherein the adjustment unit is configured to allow a selective displacement of the ottoman unit relative to the cabin floor along the first direction and a second direction perpendicular to the first direction and parallel to a plane of extension of the cabin floor, into a seating position and a resting position of the seat module;
      wherein a delimiting wall of the ottoman unit defines a passenger access path, the adjustment unit is configured to move the ottoman unit to widen the access path for the seating position, and the adjustment unit is configured to move the ottoman unit to narrow the access path for the resting position; and
   at least one longitudinal aisle, along which the plurality of seat modules are arranged, wherein the first direction is parallel to a main extension direction of the at least one aisle.

9. The seating arrangement according to claim 8,
   wherein a plurality of first seat modules is arranged directly adjacent to the at least one longitudinal aisle one behind the other,
   wherein a plurality of second seat modules, each of the second seat modules having a passenger seat and a fixedly mounted ottoman unit, is arranged directly adjacent to the first seat modules opposite to the at least one longitudinal aisle, and
   wherein the passenger access path leads to the second seat modules, and the passenger access path is provided between ottoman units and passenger seats of two first seat modules arranged behind each other.

10. The seating arrangement according to claim 9, wherein the first seat modules and the second seat modules comprise a staggered arrangement, such that second seat modules comprise a different longitudinal position than the first seat modules.

11. The seating arrangement according to claim 8, comprising two longitudinal aisles, between which a plurality of central rows of two first seat modules enclosing two second seat modules is arranged.

12. The seating arrangement according to claim 11, further comprising a plurality of lateral rows of first seat modules arranged at lateral outer positions directly adjacent to one of the aisles and second seat modules at a lateral outer position directly adjacent to the first seat modules and opposite the respective aisle.

13. An aircraft comprising:
   a fuselage;
   a cabin; and
   at least one seating arrangement positioned in the cabin, each seating arrangement comprising:
      a cabin floor;
      a plurality of seat modules, each of the seat modules comprising:
         a passenger seat attachable to the cabin floor; and
         a separate ottoman unit associated with the passenger seat, the ottoman unit having at least one resting surface for a passenger and a base attachable to the cabin floor by an adjustment unit at a position in a first direction of the passenger seat;

wherein the adjustment unit is configured to allow a selective displacement of the ottoman unit relative to the cabin floor along the first direction and a second direction perpendicular to the first direction and parallel to a plane of extension of the cabin floor, into a seating position and a resting position of the seat module;

wherein a delimiting wall of the ottoman unit defines a passenger access path, the adjustment unit is configured to move the ottoman unit to widen the access path for the seating position, and the adjustment unit is configured to move the ottoman unit to narrow the access path for the resting position; and at least one longitudinal aisle, along which the plurality of seat modules are arranged, wherein the first direction is parallel to a main extension direction of the at least one aisle.

\* \* \* \* \*